| United States Patent [19] | [11] Patent Number: 4,946,607 |
|---|---|
| Segaud | [45] Date of Patent: Aug. 7, 1990 |

[54] AQUEOUS LUBRICANT DISPERSIONS OF RARE EARTH HALIDES

[75] Inventor: Christian Segaud, Genas, France

[73] Assignee: Rhone-Poulenc Chimie, Courbevoie, France

[21] Appl. No.: 419,218

[22] Filed: Oct. 10, 1989

[30] Foreign Application Priority Data

Oct. 10, 1988 [FR] France ............................ 88 13263

[51] Int. Cl.$^5$ ................ C10M 173/00; C10M 141/02
[52] U.S. Cl. ..................................... 252/25; 252/49.3; 252/49.5; 252/33.4; 252/49.8; 252/51.5 A; 252/51.5 R; 252/56 R
[58] Field of Search ................ 252/25, 49.3, 52, 56 R, 252/49.5, 51.5 A, 33.4, 49.8

[56] References Cited

U.S. PATENT DOCUMENTS

| 3,453,209 | 7/1969 | Sibert | 252/25 |
|---|---|---|---|
| 3,830,280 | 8/1974 | Larsen | 252/25 |
| 4,034,133 | 7/1977 | Fleck | 428/64 |
| 4,507,214 | 3/1985 | Aldorf | 252/25 |
| 4,735,734 | 4/1988 | Staub et al. | 252/49.5 |

*Primary Examiner*—Jacqueline V. Howard
*Attorney, Agent, or Firm*—Burns, Doane, Swecker & Mathis

[57] ABSTRACT

Novel aqueous lubricant dispersions contain at least one rare earth halide, e.g., cerium trifluoride, and at least one polymeric dispersing agent therefor, such at least one dispersing agent including:

(a) a copolymer of an ethylenically unsaturated carboxylic acid or derivative thereof with an α-olefin comonomer and/or a vinyl comonomer;

(b) a homopolymer or copolymer of an ethylenically unsaturated carboxylic acid or derivative thereof;

(c) a copolymer of at least one ethylenically unsaturated carboxylic acid and at least one ethylenically unsaturated sulfonic acid comonomer; and/or (d) a polymer of an alkylene oxide of an (arylalkyl)-phenol, or phosphated or sulfated derivative thereof.

39 Claims, No Drawings

AQUEOUS LUBRICANT DISPERSIONS OF RARE EARTH HALIDES

BACKGROUND OF THE INVENTION

1. Field of the Invention

The present invention relates to novel dispersions of rare earth halides in an aqueous medium and to a process for the formulation thereof. This invention also relates to the use of such novel dispersions as lubricants.

2. Description of the Prior Art

When two surfaces, most typically metallic surfaces, are placed into sliding contact with each other, a lubricant is usually applied thereon in order to reduce the friction therebetween.

It is known to this art that the rare earth fluorides have desirable lubricating properties.

The use of the rare earth fluorides as lubricants requires that they be in the form of an aqueous dispersion to ensure good coverage of the surface to be protected, as well as the homogeneous and uniform distribution of the lubricant over such surface.

Furthermore, the dispersion must display adequate stability relative to the intended application, typically stability over a temperature range of from $-10°$ C. to $+45°$ C. is required.

SUMMARY OF THE INVENTION

A major object of the present invention is the provision of novel dispersions of rare earth halides in an aqueous medium that satisfy each of the aforenoted requirements.

Briefly, the present invention features dispersions of rare earth halides in an aqueous medium, comprising an aqueous formulation of at least one rare earth halide and at least one of the following dispersing agents:

(a) a copolymer of an ethylenically unsaturated carboxylic acid or derivative thereof with an $\alpha$-olefin comonomer and/or a vinyl comonomer;

(b) a homopolymer or copolymer of an ethylenically unsaturated carboxylic acid or derivative thereof;

(c) a copolymer of at least one ethylenically unsaturated carboxylic acid and at least one ethylenically unsaturated sulfonic acid comonomer; and (d) a polymer of an alkylene oxide of a (arylalkyl)-phenol, optionally phosphated or sulfated.

DETAILED DESCRIPTION OF THE PREFERRED EMBODIMENTS OF THE INVENTION

More particularly according to the present invention, it will be appreciated that the subject aqueous dispersions contain at least one rare earth halide.

By the term of "rare earth" according to the invention are intended the rare earth elements having atomic numbers ranging from 57 to 71, inclusive, as well as yttrium which has an atomic number of 39.

The preferred rare earth elements are the ceric rare earths, such as lanthanum, cerium, praseodymium, neodymium and samarium. Among these, cerium is especially preferred.

Particularly representative of such rare earth halides are the chlorides and fluorides, with the latter being the preferred.

The aggregate sizes of the rare earth trifluorides typically range from 0.05 to 3.0 $\mu$m, with a more or less restricted grain size distribution, depending on the process for the production of the fluoride. One advantage of note of the aqueous dispersions of the invention is that they may be formulated from any rare earth fluoride, regardless of its grain size distribution.

An especially preferred cerium trifluoride is that described in French Application No. 88/08909, which has a fine and restricted grain size distribution.

It has a mean diameter of its aggregates ranging from 0.1 to 0.5 $\mu$m and preferably from 0.15 to 0.30 $\mu$m, with the grain size fraction larger than 1 $\mu$m and 2 $\mu$m respectively being less than 10% and 5% by weight. The monodispersed nature of the aggregate size distribution is indicated by the "dispersion index", defined by the ratio $(d_{84}-d_{16})/2d_{50}$, which is within a range of 0.3 to 0.6 and preferably 0.3 to 0.45.

An aqueous dispersion of a rare earth halide having good stability is thus provided by the present invention, by incorporating at least one dispersing agent comprising the above homo- or copolymers (a), (b), (c) and/or (d), whether used alone or in any admixture thereof.

Specifically, the copolymer (a) is prepared by copolymerizing:

(i) an unsaturated carboxylic acid or derivative thereof having the following formula (I):

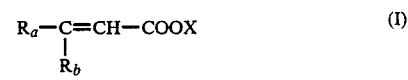

wherein $R_a$ is a hydrogen atom, or an alkyl radical having from 1 to 10 carbon atoms and optionally bearing a —COOX group; $R_b$ is a hydrogen atom or a —COOX group; and X is a hydrogen atom or an organic or inorganic base cation; with (ii) an $\alpha$-olefin comonomer having the following formula (II) and/or a vinyl comonomer having the following formula (III):

wherein $R_c$ is a hydrogen atom or a linear or branched chain alkyl radical having from 1 to 4 carbon atoms; $R_d$ is a linear or branched chain alkyl radical having from 1 to 12 carbon atoms; $R_e$ is a hydrogen atom or a linear or branched chain alkyl radical having from 1 to 4 carbon atoms; $R_f$ is one of the following groups:

(1)

in which $R_g$ is a hydrogen atom or one or more alkyl radicals having from 1 to 4 carbon atoms;

(2) —Cl;

(3) —OOC—$R_h$, in which $R_h$ is an alkyl radical having from 1 to 8 carbon atoms;

(4) —O—$R_i$, in which $R_i$ is $R_h$ as defined above;

(5) —COOX, in which X is as defined above;

(6) —COO—$R_j$, in which $R_j$ is $R_h$ as defined above;

(7) —CO—$NH_2$; and (8) —C≡N.

In the immediately above description, by the term "organic or inorganic base cation" are intended metal atoms, most typically an alkali metal, such as sodium or potassium, an ammonium radical or a substituted ammonium radical of the formula $N(R_kR_lR_mR_n)$, in which $R_k$ is hydrogen and $R_l$, $R_m$ and $R_n$, which may be identical or different, are each a hydrogen atom, or a linear or branched chain alkyl or hydroxyalkyl radical having from about 1 to 4 carbon atoms, or a phenyl radical, with the proviso that two of such alkyl radicals may together form a single divalent radical optionally containing a bridging oxygen atom.

Exemplary of the comonomers advantageously used for the preparation of the copolymer (a), the following are especially representative:

(i) as the carboxylic acid or derivative thereof: maleic or fumaric acid or derivatives thereof, such as the esters or hemiesters; itaconic acid, citraconic acid; maleic anhydride; the mono- and dialkylmaleic acids and the mono- and dialkylfumaric acids, the alkyl moiety thereof having from 1 to 4 carbon atoms;

(ii) as the α-olefin comonomer: preferably, an unsaturated straight or branched chain hydrocarbon having from 2 to 8 carbon atoms, for example ethylene, propylene, 1-butene, isobutylene, n-1-pentene, isoprene, 2-methyl-1-butene, n-1-hexene, 2-methyl-1-pentene, 4-methyl-1-pentene, 2-ethyl-1-butene, 2,4,4-trimethyl-1-pentene (diisobutylene), 1,3-butadiene, 1,3-hexadiene, 1,3-octadiene, 2-methyl-3,3-dimethyl-1-pentene, 2-methyl 4,4-dimethyl-1-pentene; and also the vinyl compounds, such as styrene, vinyl chloride, the vinyl esters of aliphatic acids having from 1 to 8 carbon atoms, e.g., vinyl acetate, vinyl propionate, vinyl butyrate; the vinyl ethers, such as methyl oxide, vinyl oxide; acrylic or methacrylic acid and alkyl esters thereof having from 1 to 8 carbon atoms, such as methyl, ethyl or butyl acrylate, methyl, ethyl or butyl methacrylate; acrylamide and methacrylamide; and acrylonitrile and methacrylonitrile.

The preferred comonomers are maleic anhydride and diisobutylene.

The proportion of monomers to be used is such that the molar ratio of the unsaturated carboxylic acid of formula (I)/unsaturated compound of formula (II) and/or (III) is about 1, and preferably is equal to 1.

The copolymers (a) preferred are those having a weight average molecular weight ranging from 500 to 50,000, preferably from 500 to 15,000.

Such copolymers are prepared by radical polymerization in a solvent, for example benzene, toluene, xylene, dioxane, ethyl acetate or possibly in a large excess of the α-olefin or vinyl comonomer.

The catalysts generating the free radicals suitable for the preparation of the copolymers (a) most typically are peroxides, hydroperoxides or azo compounds, such as, for example, acetyl peroxide, di-tert-butyl peroxide, benzoyl peroxide, lauroyl peroxide, tert-butyl perbenzoate, methyl hydroperoxide, ethyl hydroperoxide, tert-butyl hydroperoxide, cumene hydroperoxide, azodiisobutyronitrile and dimethyl azoisobutyrate.

The catalyst is advantageously employed in proportions of 0.3% to 5% by weight of the starting monomers.

The temperature of polymerization preferably ranges from 60° C. to the boiling point of the reaction medium.

The copolymer (a) is obtained in organic solution. It may be optionally neutralized by the addition of a base until a pH between 8 and 12 is attained. Suitable such bases are sodium, potassium or ammonium hydroxide, or a quaternary ammonium hydroxide, for example trimethylbenzylammonium hydroxide.

The copolymer (a), optionally neutralized, is converted into an aqueous solution by the addition of water, followed by the distillation of the organic solvent.

The aqueous solution of the copolymer (a) may have a dry solids content of up to 25% by weight.

The copolymer (a) may be provided in the form of a powder, by drying in an atomizing furnace, by pulverizing the aqueous solution previously obtained in a flowstream of hot air at a temperature of from 140° to 240° C.

Commercially available copolymers (a) include the maleic anhydride/diisobutylene copolymer marketed by Rhone-Poulenc and Geronazzo under the trademarks GEROPON T 36, GEROPON TA 72 and GEROPON TAK.

The dispersing agent may also comprise a copolymer (b) produced by polymerization of at least one ethylenically unsaturated carboxylic acid or derivative thereof having the following formula (IV):

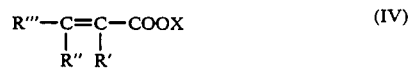

wherein $R'$ is a hydrogen atom, a chlorine atom, or a linear or branched chain alkyl radical having from 1 to 4 carbon atoms and optionally bearing a —COOX group; $R''$ is a hydrogen atom or a linear or branched chain alkyl radical having from 1 to 4 carbon atoms; $R'''$ is a hydrogen atom, a linear or branched chain alkyl radical having from 1 to 4 carbon atoms or a —COOX group; and X is as defined above.

Exemplary of the starting material monomers having the formula (IV), particularly representative are acrylic or methacrylic acid and the alkyl esters thereof containing from 1 to 4 carbon atoms, such as methyl, ethyl or butyl acrylate or methacrylate, and ethacrylic, α-chloroacrylic, crotonic, itaconic, maleic, fumaric, citraconic and mesaconic acids.

The preferred polymers (b) are those produced by polymerization of acrylic and/or methacrylic acid.

The polyacrylic and/or polymethacrylic acids or derivatives thereof according to the invention are well known polymers. Such polymers having a weight average molecular weight ranging from 1,000 to 10,000, preferably from 2,000 to 6,000, are quite suitable. They are prepared in conventional manner.

Typically, the acrylic acids and derivatives thereof may be polymerized in mass, in an aqueous organic solution, in emulsion or aqueous dispersion. In any event, the polymerization is carried out utilizing a polymerization initiator, which may be an anionic, organometallic initiator or a free radical produced by a heat treatment, a redox system, or under the influence of radiation. The polymerization of acrylic and methacrylic acid in solution may be carried out in water by heating the monomer in the presence of initiators, such as hydrogen peroxide, potassium persulfate, acetyl peroxide, or by polymerization of the monomer at a lower temperature ranging from 50° to 100° C., while initiating the reaction using a redox system of potassium persulfate/sodium thiosulfate type.

A similar polymerization in aqueous solution may be carried out by irradiating the aqueous solution with ultraviolet light.

It is also possible to conduct the polymerization in organic solvents such as methanol, dioxane, etc., in the presence of azobiisobutyronitrile and at high temperatures, or in solvents such as benzene or n-hexane, using benzoyl peroxide as the initiator, to thus produce an insoluble polymer which is separated from the reaction medium by filtration.

Salts of acrylic and methacrylic acids may be polymerized in an aqueous medium in the presence of initiators, but most typically the salts of polyacrylic acids and homologs thereof are prepared by neutralizing the corresponding polymer with an inorganic base, such as, for example, sodium, potassium or ammonium hydroxide or with an organic base, in particular alkanolamines, such as monoethanolamine, diethanolamine, triethanolamine, N-methyldiethanolamine, N-ethyldiethanolamine, N-propyldiethanolamine, N-isopropyldiethanolamine, N,N-dimethylethanolamine, N,N-diethylethanolamine, N,N-dipropylethanolamine and N,N-diisopropylethanolamine.

Commercially available polymers (b), marketed by the assignee hereof, include an acrylic acid/acrylic ester neutralized with triethanolamine (GEROPONG DA), a potassium polymethacrylate (GEROPONG DG) and a homopolymer of acrylic acid neutralized with triethanolamine (GEROPON HB).

The dispersing agent may also comprise a copolymer (c), produced by polymerization of at least one ethylenically unsaturated carboxylic acid and at least one ethylenically unsaturated sulfonic acid.

Exemplary of the starting material ethylenically unsaturated carboxylic acids for preparing the copolymers (c) are acrylic, methacrylic, ethacrylic, α-chloroacrylic, crotonic, itaconic, maleic, fumaric, citraconic and mesaconic acids.

Preferably, acrylic acid and/or methacrylic acid are polymerized and, more particularly, an acrylic/methacrylic acid pair, in a molar ratio on the order of 0.05/1 to 10/1 and preferably on the order of 0.10/1 to 6/1.

Exemplary of the ethylenically unsaturated sulfonic acid salts for preparing the copolymers (c) are the allylsulfonates, methallylsulfonates, vinylsulfonates or styrenesulfonates of the alkali metals, or the ammonium salts, and in particular sodium or potassium methallylsulfonate.

According to the invention, the molar percentage of the ethylenically unsaturated sulfonic acid may constitute 1 to 60 mole %, preferably 2 to 25 mole % and more preferably 3 to 8 mole % of the total mixture of monomers.

The weight average molecular weight of such copolymers (c) is low; it may be on the order of 500 to 8,000. It generally is on the order of 900 to 6,000, preferably on the order of 1,500 to 4,000.

The copolymers (c) may be prepared by conventional polymerization methods.

For example, such copolymers (c) may be prepared by the radical polymerization, in aqueous solution, of the ethylenically unsaturated carboxylic acid or acids with a salt or salts of the ethylenically unsaturated sulfonic acids. It is possible, for example, to use hydrogen peroxide as the catalyst for the formation of free radicals in combination with isopropyl alcohol in the presence of small amounts of a copper salt, which may be replaced by a given amount of hydroxylamine sulfate, or hydrogen peroxide with an iron salt (ferrous sulfate) and hydroxylamine sulfate, or a sodium or ammonium persulfate in the presence of acetic acid.

The copolymer of acrylic acid/methacrylic acid/sodium methallylsulfonate is especially suitable for the invention; it is described in FR No. 2,483,932 and is marketed by the assignee hereof under the tradename PETROGIL D/161 ® or D/164 ®.

The dispersing agent too may comprise a polymer (d), for example polyoxyalkylene poly(1-phenylalkyl)-phenols, or mixed sulfates of polyoxyalkylene poly(1-phenylalkyl)phenols, or phosphoric esters of polyoxyalkylene poly(1-phenylalkyl)phenols, having the following formulae (V) to (VII):

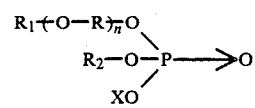

wherein n is a number ranging from about 1 to about 40; X is a hydrogen atom or an inorganic or organic base cation as defined above; R is an alkylene radical having from 2 to 4 carbon toms; $R_2$ is a radical X, with the proviso that the two radicals X may be identical or different (if $R_2 = X$), or one of the radicals $R-(O-R)_{\overline{n}}$ with the proviso that $R_2$ and $R_1-(O-R)_{\overline{n}}$ may also be identical or different; $R_1$ is one of the radicals of the following formula (VIII):

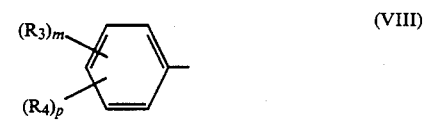

in which m is an integer equal to 1, 2, 3; p is an integer equal to 1 or 2; $R_4$ is a hydrogen atom or an alkyl radical having from 1 to 4 carbon atoms; and $R_3$ is a radical of the formula (IX):

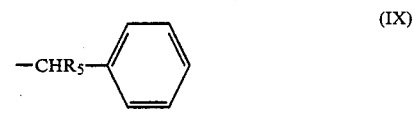

in which $R_5$ is a hydrogen atom, an alkyl radical having from 1 to 4 carbon atoms, or a phenyl radical.

The compounds of formulae (V) to (VII) are known compounds. Processes for the preparation thereof are described in French Application Nos. 86/10,159 and 88/05,966.

The preferred dispersing agents (d) have one of the formulae (V) to (VII), in which:
(i) R is an ethylene radical;
(ii) $R_1$ is a radical of formula (VIII), in which m is a number equal to 2 or 3; $R_4$ is a hydrogen atom; $R_3$ is a radical of the formula (IX):

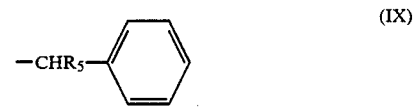

in which $R_5$ is either a radical X (the two radicals X being equal if $R_2 = X$), or a radical $R_1-(O-CH-$ $2-CH_2)_{\overline{n}}$ with the radicals $R_2$ and $R_1-O+CH_2-CH_2)_{\overline{n}}$ being equal.

Preferred dispersing agents (d) are those of formulae (V) to (VII), in which:

(i) n ranges from 3 to 40;

(ii) X is a hydrogen atom, a sodium or potassium atom, an ammonium radical, or a monoethanolamine, diethanolamine or triethanolamine radical;

(iii) R is an ethylene radical;

(iv) $R_1$ is a radical of formula (VIII), in which m is a number equal to 2 or 3; $R_4$ is a hydrogen atom; and $R_3$ is a radical of the formula (IX):

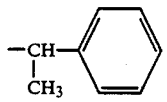

(IX)

(v) $R_2$ is either a radical X (with the two radicals being identical if $R_2=X$), or a radical $R_1+O-CH_2-CH_2)_n$, with the radicals $R_2$ and $R_1+O-CH_2-CH_2)_{\overline{n}}$ being equal.

The preferred dispersing agents (d) are the following:

(A) the polyoxyethylene tri(1-phenylethyl)phenols having 10 to 40 moles of ethylene oxide (E.O.) per mole of phenol;

(B) the polyoxyethylene di(1-phenylethyl)phenols having 3 to 20 moles of ethylene oxide (E.O.) per mole of phenol;

(C) the polyoxyethylene tri(1-phenylethyl)phenol sulfates having 10 to 40 moles of ethylene oxide (E.O.) per mole of phenol, in the acid form or neutralized;

(D) the polyoxyethylene di(1-phenylethyl)phenol sulfates having 3 to 20 moles of ethylene oxide (E.O.) per mole of phenol, in the acid form or neutralized;

(E) the phosphoric mono- or diesters of polyoxyethylene tri(1-phenylethyl)phenols having 10 to 40 moles of ethylene oxide (E.O.) per mole of phenol, in the acid form or neutralized; and (F) the phosphoric mono- and diesters of polyoxyethylene di(1-phenylethyl)phenols having 3 to 20 moles of ethylene oxide (E.O.) per mole of phenol, in the acid form or neutralized.

The various dispersing agents (d) noted above are also known materials and are commercially available. They are marketed by the assignee hereof under the following respective trademarks:

(A) SOPROPHOR BSU (16 E.O.) CYU (20 E.O.);

(B) SOPROPHOR DS 15 (15 E.O.);

(C) SOPROPHOR 4 D 384 (16 E.O., acid form); (D) SOPROPHOR DSS 5 (5 E.O.), DSS 7 (7 E.O.), DSS 11 (11 E.O.), DSS 15 (15 E.O.) (acid form or neutralized);

(E) SOPROPHOR 3 D 33 (16 E.O., acid form), FL (16 E.O., neutralized triethanolamine), FLK (16 E.O., neutralized with potassium hydroxide);

(F) SOPROPHOR 10 D 12/5 (5 E.O.), 10 D 12/7 (7 E.O.), 10 D 12/11 (11 E.O.), 10 D 12/15 (15 E.O.) (neutralized or acid form).

It will of course be appreciated that the compounds of formulae (V) to (VII) may be used separately or in any admixture. The phosphoric esters of formula (VII) may be used separately, or more generally in the form of mixtures of monoesters with the corresponding diester.

In addition to the dispersing agent comprising the aqueous dispersions of rare earth halides according to the invention, it may be desirable to incorporate auxiliary materials, such as, for example, antifoaming agents and antigelation agents.

The antifoaming agents are intended to control the formation of foam during the preparation of the dispersion. Preferably, agents of the polysiloxane type are used for this purpose.

The antigelation agents are used to prevent the possible formation of crystals during the storage of the dispersions. Conventional antigelation agents, such as ethylene glycol, propylene glycol, glycerol, diethylene glycol, triethylene glycol, tetraethylene glycol, urea, and the like, may thus be incorporated.

The proportions by weight of the different components of the dispersions according to the invention are generally within the following ranges:

(i) 5% to 80% of one or more rare earth halides;

(ii) 0.1% to 12% of a dispersing agent (a), (b), (c) and/or (d);

(iii) 0% to 5% of an antifoaming agent;

(iv) 0% to 20% of an antigelation agent;

(v) water, in an amount sufficient to constitute 100% of the dispersion.

The preferred dispersions have the following compositions:

(i) 20% to 60% of one or more rare earth halides;

(ii) 0.3% to 8% of a dispersing agent (a), (b), (c) and/or (d);

(iii) 0% to 3% of an antifoaming agent;

(iv) 0 to 15% of an antigelation agent;

(v) water, in an amount sufficient to constitute 100% of the dispersion.

One technique for formulating an aqueous dispersion of rare earth halides entails preparing a solution containing the dispersing agent described above, optionally an antigelation agent, and the water which constitutes the dispersion medium, next agitating the dispersion and adding at least one rare earth halide, then grinding the dispersion and optionally degassing the resulting dispersion.

The preparation of the dispersion medium is not difficult. It is carried out under agitation by conventional means of agitation (anchor, helical or turbine agitators).

The rare earth halide is dispersed under agitation.

Grinding is continued until an average particle size of about 4 μm is produced. It is preferable that the particles not be larger than 50 μm.

The dispersion may be ground in a vertical or horizontal ball grinder.

Degassing is carried out by maintaining the dispersion under weak agitation.

It is possible to add all or a part of the antifoaming agent during grinding or degassing.

According to the invention, rare earth halides dispersed in an aqueous medium are produced, having the following properties:

(1) a very high stability in storage;

(2) a high content in rare earth halides; and (3) a low viscosity.

In order to further illustrate the present invention and the advantages thereof, the following specific examples are given, it being understood that same are intended only as illustrative and in nowise limitative.

Experiments A and B are given by way of comparison.

EXAMPLES 1 TO 11

In Examples 1 to 11, cerium trifluoride was dispersed in an aqueous medium. The cerium trifluoride had a mean aggregate diameter of 0.3 μm.

In all of the examples, the procedure described below was followed:

Initially, the dispersion medium was prepared by dissolving 50 g of the dispersing agent set forth in the different examples in 70 g of monoethylene glycol, whereupon 0.1 g of an antifoaming agent 416/R (silicone) was added (manufactured and marketed by the assignee hereof), as well as sufficient water to provide a total volume of 1 liter.

Depending on the particular case, 1,000 g or 1,500 g cerium trifluoride were added, under agitation, by means of an ULTRA-TURAX turbine rotating at 1,500 rpm.

The agitation was maintained for 3 min to produce a homogeneous mixture.

In this manner a predispersion was obtained, which was then ground in a "Mini Motor Mill" marketed by Eiger Engineering Ltd. The grinding chamber was filled with 59 g glass beads 1 mm in diameter and rotated at 4,000 rpm. Grinding was continued for about 4 min.

The mixture obtained was permitted to remain at rest for 3 to 4 hours (in order to eliminate any bubbles and foam present).

The stability properties of the dispersion were determined by subjecting it to an accelerated aging test, i.e., heating the dispersion in an oven at 50° C. for 20 days.

The consistency of the dispersion resulting after storage was determined by measuring its viscosity by means of a FORD No. 4 apparatus (cF4) at ambient temperature.

It was considered that the resulting product was pourable if its viscosity was less than 30 seconds.

For good results, it is desirable that its viscosity be less than 20 seconds.

EXAMPLES 1 TO 4

Dispersions of cerium trifluoride comprising a copolymer (a) dispersing agent:

The following polymers were used as dispersing agents:

In Examples 1 and 2: a maleic anhydride/diisobutylene copolymer neutralized with sodium hydroxide (GEROPON T 36);

In Examples 3 and 4: a maleic anhydride/diisobutylene copolymer neutralized with potassium hydroxide (GEROPON TAK).

By the procedure described above, aqueous dispersions of cerium trifluoride were prepared with the different concentrations of 1,000 g/l and 1,500 g/l, utilizing the copolymers (a).

The results obtained are reported in Table I:

TABLE I

| EXAMPLE | Dispersing agent | Dispersion Concentration in CeF$_3$ | pH of the Dispersion | After storage for 20 days at 50° C. Viscosity (coupe FORD No. 4) | Observations |
| --- | --- | --- | --- | --- | --- |
| 1 | Sodium salt of maleic anhydride/ diisobutylene copolymer (GEROPON T 36) | 1,000 g/l | pH = 9.7 | CF = 13 s | No sedimentation |
| 2 | Sodium salt of maleic anhydride/ diisobutylene copolymer (GEROPON T 36) | 1,500 g/l | pH = 9.7 | CF = 17 s | No sedimentation |
| 3 | Potassium salt of maleic anhydride/ diisobutylene copolymer (GEROPON TAK) | 1,000 g/l | pH = 10.4 | CF = 12 s | No sedimentation |
| 4 | Potassium salt of maleic anhydride/ diisobutylene copolymer (GEROPON TAK) | 1,500 g/l | pH = 10.4 | CF = 15 s | No sedimentation |

EXAMPLES 5 TO 8

Dispersions of cerium trifluoride comprising a homopolymer (b) dispersing agent:

The following homopolymer were used as the dispersing agents:

In Examples 5 and 6: a polyacrylate neutralized with triethanolamine and having a molecular weight of 5,000 (GEROPON HB);

In Examples 7 and 8: a polymethacrylate neutralized with potassium hydroxide, having a molecular weight of 2,500 (GEROPON DG).

Aqueous dispersion of cerium trifluoride were prepared as described above with the different concentrations of 1,000 g/l and 1,500 g/l, utilizing the aforesaid homopolymers (b).

The results obtained are reported in Table II:

TABLE II

| EXAMPLE | Dispersing agent | Dispersion Concentration in CeF$_3$ | pH initial | After storage for 20 days at 50° C. Viscosity (coupe FORD No. 4) | Observations |
|---|---|---|---|---|---|
| 5 | Triethanolamine polyacrylate (GEROPON HB) | 1,000 g/l | pH = 8.5 | CF = 13 s | No sedimentation |
| 6 | Triethanolamine polyacrylate (GEROPON HB) | 1,500 g/l | pH = 8.5 | CF = 14 s | No sedimentation |
| 7 | Potassium polymethacrylate (GEROPON DG) | 1,000 g/l | pH = 6.6 | CF = 14 s | No sedimentation |
| 8 | Potassium polymethacrylate (GEROPON DG) | 1,500 g/l | pH = 6.6 | CF = 16 s | No sedimentation |

EXAMPLE 9

Dispersion of cerium trifluoride comprising a terpolymer (c) dispersing agent:

In this example, an aqueous dispersion of cerium trifluoride (1,000 g/l) was prepared using, as the dispersing agent, an acrylic acid/methacrylic acid/sodium methallylsulfonate terpolymer, in a molar ratio acrylic acid/methacrylic acid equal to 1.19 and a molar percentage of sodium methallylsulfonate of 5.6% (PETROGIL D 161); this terpolymer had been prepared as described in FR No. 2,483,932.

The aqueous dispersion of cerium trifluoride had an initial pH of 3.00. In a stability test, it did not sediment during storage and its viscosity after storage (cF4) was 13 seconds.

EXAMPLES 10 AND 11

Cerium trifluoride comprising a polymer (d) dispersing agent

In Examples 10 and 11, aqueous dispersions of cerium trifluoride were prepared, in the respective concentrations of 1,000 and 1,500 g/l, using as the dispersing agent a mixture of phosphoric mono- and diesters of polyethylene tri(1-phenylethyl)phenol, including 16 moles of ethylene oxide per mole of phenol, neutralized with triethanolamine (SOPROPHOR FL).

The results obtained are reported in Table III:

TABLE III

| EXAMPLE | Dispersing agent | Dispersion Concentration in CeF$_3$ | pH initial | After storage for 20 days at 50° C. Viscosity (coupe FORD No. 4) | Observations |
|---|---|---|---|---|---|
| 10 | Phosphoric ester of polyoxyethylene tri(1-phenylethyl) phenol, TEA neutralized (SOPROPHOR FL) | 1,000 g/l | pH = 7.1 | CF = 12 s | No sedimentation |
| 11 | Phosphoric ester of polyoxyethylene tri(1-phenylethyl) phenol, TEA neutralized (SOPROPHOR FL) | 1,500 g/l | pH = 7.1 | CF = 20 s | No sedimentation |

COMPARATIVE EXPERIMENT A

In this experiment, an aqueous dispersion of 1,000 g/l cerium trifluoride was prepared using, as the dispersing agent, a condensate of 4,4-dihydroxy-diphenylsulfone (GEROPON GN).

The aqueous dispersion of cerium trifluoride had an initial pH of 6.4. According to the stability test, flocculation of the dispersion was observed and its viscosity measured after storage (cF4) was 48 seconds.

COMPARATIVE EXPERIMENT B

In this experiment, an aqueous dispersion of cerium trifluoride was prepared, in a concentration of 1,000 g/l, using, as the dispersing agent, a polyoxyethylene nonylphenol having 17 moles of ethylene oxide per mole of phenol (SOPROPHOR BC 17).

The above procedure was followed, but it was not possible to carry out the grinding operation, as solidification occurred which blocked the grinder.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A lubricant composition of matter, which comprises an aqueous dispersion of at least one rare earth halide and at least one dispersing agent therefor, said at least one dispersing agent comprising:

(a) a copolymer of an ethylenically unsaturated carboxylic acid or derivative thereof with an α-olefin comonomer and/or a vinyl comonomer;

(b) a homopolymer or copolymer of an ethylenically unsaturated carboxylic acid or derivative thereof;

(c) a copolymer of at least one ethylenically unsaturated carboxylic acid and at least one ethylenically unsaturated sulfonic acid comonomer; and/or (d) a polymer of an alkylene oxide of an (arylalkyl)-phenol, or phosphated or sulfated derivative thereof.

2. The lubricant composition as defined by claim 1, said at least one rare earth halide comprising a rare earth trifluoride.

3. The lubricant composition as defined by claim 2, said at least one rare earth comprising lanthanum, cerium, praseodymium, neodymium and/or samarium.

4. The lubricant composition as defined by claim 3, comprising a cerium trifluoride having a mean aggregate diameter ranging from 0.1 to 0.5 μm.

5. The lubricant composition as defined by claim 1, said at least one dispersing agent comprising the copolymerizate (a) of a monomer having the formula (I):

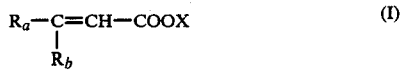

wherein $R_a$ is a hydrogen atom, or an alkyl radical having from 1 to 10 carbon atoms or a substituted such alkyl radical bearing a —COOX group; $R_b$ is a hydrogen atom or a —COOX group; and X is a hydrogen atom or an organic or inorganic base cation; with an α-olefin comonomer having the following formula (II) and/or a vinyl comonomer having the following formula (III):

wherein $R_c$ is a hydrogen atom or a linear or branched chain alkyl radical having from 1 to 4 carbon atoms; $R_d$ is a linear or branched chain alkyl radical having from 1 to 12 carbon atoms; $R_e$ is a hydrogen atom or a linear or branched chain alkyl radical having from 1 to 4 carbon atoms; and $R_f$ is one of the following groups (1) to (8):

(1)

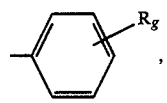

in which $R_g$ is a hydrogen atom or one or more alkyl radicals from 1 to 4 carbon atoms;

(2) —Cl;

(3) —OOC—$R_h$, in which $R_h$ is an alkyl radical having from 1 to 8 carbon atoms;

(4) —O—$R_i$, in which $R_i$ is $R_h$ as defined above;

(5) —COOX, in which X is as defined above;

(6) —COO—$R_j$, in which $R_j$ is $R_h$ as defined above;

(7) —CO—$NH_2$; and (8) —C≡N.

6. The lubricant composition as defined by claim 5, said monomer having the formula (I) comprising maleic or fumaric acid or ester or hemiester thereof, itaconic acid, citraconic acid, maleic anhydride, a mono- or dialkylmaleic acid, or a mono- or dialkylfumaric acid, the alkyl moieties thereof having from 1 to 4 carbon atoms.

7. The lubricant composition as defined by claim 6, said comonomer having the formula (II) and/or (III) comprising ethylene, propylene, 1-butene, isobutylene, n-1-pentene, isoprene, 2-methyl-1-butene, n-1-hexene, 2-methyl-1-pentene, 4-methyl-1-pentene, 2-ethyl-1-butene, 2,4,4-trimethyl-1-pentene, 1,3-butadiene, 1,3-pentadiene, 1,3-hexadiene, 1,3-octadiene, 2-methyl-3,3-dimethyl-1-pentene, or 2-methyl-4,4-dimethyl-1-pentene.

8. The lubricant composition as defined by claim 6, comprising a monomer having the formula (III), which comprises styrene, vinyl chloride, a vinyl ester of an aliphatic acid having from 1 to 8 carbon atoms, a vinyl ether, acrylic or methacrylic acid or alkyl ester thereof having from 1 to 8 carbon atoms, acrylamide, methacrylamide, acrylonitrile, or methacrylonitrile.

9. The lubricant composition as defined by claim 5, said copolymer (a) comprising a maleic anhydride/diisobutylene copolymer.

10. The lubricant composition as defined by claim 5, said copolymer (a) having a weight average molecular weight ranging from 500 to 50,000.

11. The lubricant composition as defined by claim 10, said copolymer (a) having a weight average molecular weight ranging from 500 to 15,000.

12. The lubricant composition as defined by claim 5, wherein said copolymer (a) the molar ratio of the monomer of formula (I)/comonomer of formula (II) and/or (III) is about 1.

13. The lubricant composition as defined by claim 5, said copolymer (a) having been neutralized with a base to provide a pH ranging from 8 to 12.

14. The lubricant composition as defined by claim 1, said at least one dispersing agent comprising the polymerizate (b) of at least one monomer having the formula (IV):

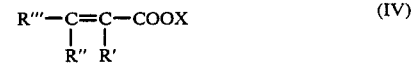

wherein R' is a hydrogen atom, a chlorine atom, or a linear or branched chain alkyl radical having from 1 to 4 carbon atoms or substituted such alkyl radical bearing a —COOX group; R" is a hydrogen atom or a linear or branched chain alkyl radical having from 1 to 4 carbon atoms; R'" is a hydrogen atom, a linear or branched chain alkyl radical having from 1 to 4 carbon atoms or a —COOX group; and X is a hydrogen atom or an organic or inorganic base cation.

15. The lubricant composition as defined by claim 14, said polymer (b) comprising the polymerizate of acrylic or methacrylic acid or lower alkyl ester thereof, or of ethacrylic, α-chloroacrylic, crotonic, itaconic, maleic, fumaric, citraconic or mesaconic acid.

16. The lubricant composition as defined by claim 15, said polymer (b) comprising a polymerizate of acrylic or methacrylic acid.

17. The lubricant composition as defined by claim 14, said polymer (b) having been neutralized with sodium, potassium or ammonium hydroxide, or an alkanolamine.

18. The lubricant composition as defined by claim 1, said at least one dispersing agent comprising the copolymerizate (c) of acrylic, methacrylic, ethacrylic, α-chloroacrylic, crotonic, itaconic, maleic, fumaric, citraconic or mesaconic acid.

19. The lubricant composition as defined by claim 18, said at least one dispersing agent comprising the copolymerizate (c) of acrylic or methacrylic acid.

20. The lubricant composition as defined by claim 19, said at least one dispersing agent comprising the copolymerizate (c) of a mixture of acrylic and methacrylic acids, in a molar ratio ranging from 0.05/1 to 10/1.

21. The lubricant composition as defined by claim 20, said molar ratio ranging from 0.10/1 to 6/1.

22. The lubricant composition as defined by claim 18, said at least one dispersing agent comprising the copolymerizate (c) of an alkali metal or ammonium alkylsulfonate, methallylsulfonate, vinyl sulfonate, or styrene sulfonate.

23. The lubricant composition as defined by claim 22, said at least one dispersing agent comprising the copolymerizate (c) of sodium or potassium methallylsulfonate.

24. The lubricant composition as defined by claim 18, said at least one ethylenically unsaturated sulfonic acid comonomer comprising from 1 to 60 mole % of the total amount of comonomers comprising said copolymerizate (c).

25. The lubricant composition as defined by claim 24, said at least one ethylenically unsaturated sulfonic acid comonomer comprising from 3 to 8 mole % of the total amount of comonomers comprising said copolymerizate (c).

26. The lubricant composition as defined by claim 18, said copolymerizate (c) having a weight average molecular weight ranging from 500 to 8,000.

27. The lubricant composition as defined by claim 26, said copolymerizate (c) having a weight average molecular weight ranging from 1,500 to 4,000.

28. The lubricant composition as defined by claim 1, said at least one dispersing agent comprising a polymerizate (d) having one of the formulae (V), (VI) or (VIII):

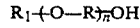  (V)

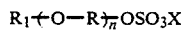  (VI)

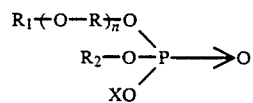  (VII)

wherein n is a number ranging from about 1 to about 40; X is a hydrogen atom or an inorganic or organic base cation; R is an alkylene radical having from 2 to 4 carbon atoms; $R_2$ is a radical X, with the proviso that the two radicals X may be identical or different if $R_2=X$, or one of the radicals $R-(O-R)_{\overline{n}}$, with the proviso that $R_2$ and $R_1-(O-R)_{\overline{n}}$ may also be identical or different; $R_1$ is one of the radicals of the following formula (VIII):

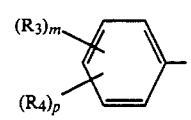  (VIII)

in which m is an integer equal to 1, 2, 3; p is an integer equal to 1 or 2; $R_4$ is a hydrogen atom or an alkyl radical having from 1 to 4 carbon atoms; and $R_3$ is a radical of the formula (IX):

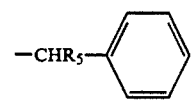  (IX)

in which $R_5$ is a hydrogen atom, an alkyl radical having from 1 to 4 carbon atoms, or a phenyl radical.

29. The lubricant composition as defined by claim 28, wherein said polymerizate (d):
 (i) R is an ethylene radical;
 (ii) $R_1$ is a radical of formula (VIII), in which m is a number equal to 2 or 3; $R_4$ is a hydrogen atom; $R_3$ is a radical of the formula (IX):

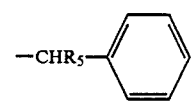  (IX)

in which $R_5$ is either a radical X, with the proviso that the two radicals X are equal if $R_2=X$, or a radical $R_1-(O-CH_2-CH_2)_{\overline{n}}$, with the radicals $R_2$ and $R_1-(O-CH_2-CH_2)_{\overline{n}}$ being equal.

30. The lubricant composition as defined by claim 29, wherein said polymerizate (d):
 (i) n ranges from 3 to 40;
 (ii) X is a hydrogen atom, a sodium or potassium atom, an ammonium radical, or a monoethanolamine, diethanolamine or triethanolamine radical;
 (iii) R is an ethylene radical;
 (iv) $R_1$ is a radical of formula (VIII), in which m is a number equal to 2 or 3; $R_4$ is a hydrogen atom; and $R_3$ is a radical of the formula (IX):

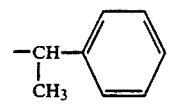  (IX)

(v) $R_2$ is either a radical X, with the proviso that the two radicals X are identical if $R_2=X$, or a radical $R_1-(O-CH_2-CH_2)_{\overline{n}}$, with the radicals $R_2$ and $R_1-(O-CH_2-CH_2)_{\overline{n}}$ being equal.

31. The lubricant composition as defined by claim 28, said copolymerizate (d) comprising a polyoxyethylene tri(1-phenylethyl)phenol having 10 to 40 moles of ethylene oxide per mole of phenol.

32. The lubricant composition as defined by claim 28, said copolymerizate (d) comprising a polyoxyethylene di(1-phenylethyl)phenol having 3 to 20 moles of ethylene oxide per mole of phenol.

33. The lubricant composition as defined by claim 28, said copolymerizate (d) comprising polyoxyethylene tri(1-phenylethyl)phenol sulfate having 10 to 40 moles of ethylene oxide per mole of phenol, in acid or neutralized form.

34. The lubricant composition as defined by claim 28, said copolymerizate (d) comprising a polyoxyethylene di(1-phenylethyl)phenol sulfate having 3 to 20 moles of ethylene oxide per mole of phenol, in acid or neutralized form.

35. The lubricant composition as defined by claim 28, said copolymerizate (d) comprising a phosphoric mono- or diester of a polyoxyethylene tri(1-phenylethyl)phenol having 10 to 40 moles of ethylene oxide per mole of phenol, in acid or neutralized form.

36. The lubricant composition as defined by claim 28, said copolymerizate (d) comprising phosphoric mono- or diester of a polyoxyethylene di(1-phenylethyl)phenol having 3 to 20 moles of ethylene oxide per mole of phenol, in acid or neutralized form.

37. The lubricant composition as defined by claim 1, further comprising an antigelation and/or an antifoaming agent.

38. The lubricant composition as defined by claim 1, comprising:
   5% to 80% of at leat one rare earth halide;
   0.1% to 12% of a dispersing agent (a), (b), (c) and/or (d);
   0% to 5% of an antifoaming agent;
   0% to 20% of an antigelation agent; and
   water, in such amount as to constitute 100% by weight.

39. The lubricant composition as defined by claim 38, comprising:
   5% to 60% of at least one rare earth halide;
   0.3% to 8% of a dispersing agent (a), (b), (c) and/or (d);
   0% to 3% of an antifoaming agent;
   0% to 15% of an antigelation agent; and
   water, in such amount as to constitute 100% by weight.

* * * * *